US009657451B2

(12) United States Patent
Delorme et al.

(10) Patent No.: US 9,657,451 B2
(45) Date of Patent: May 23, 2017

(54) MANUALLY OPERABLE PUSH FROM BEHIND SPREADER

(71) Applicant: CHAPIN MANUFACTURING, INC., Batavia, NY (US)

(72) Inventors: John D. Delorme, Spencerport, NY (US); William C. Bouton, Alexander, NY (US)

(73) Assignee: CHAPIN MANUFACTURING, INC., Batavia, NY (US)

( * ) Notice: Subject to any disclaimer, the term of this patent is extended or adjusted under 35 U.S.C. 154(b) by 0 days.

(21) Appl. No.: 14/700,452

(22) Filed: Apr. 30, 2015

(65) Prior Publication Data

US 2015/0315759 A1  Nov. 5, 2015

Related U.S. Application Data

(60) Provisional application No. 61/988,003, filed on May 2, 2014.

(51) Int. Cl.
| | |
|---|---|
| *E01H 10/00* | (2006.01) |
| *E01C 19/20* | (2006.01) |
| *A01C 15/00* | (2006.01) |
| *A01C 17/00* | (2006.01) |

(Continued)

(52) U.S. Cl.
CPC ......... *E01H 10/007* (2013.01); *A01C 15/007* (2013.01); *A01C 17/001* (2013.01); *A01C 19/04* (2013.01); *B05B 3/1007* (2013.01); *E01C 19/203* (2013.01)

(58) Field of Classification Search
CPC ... A01C 15/007; A01C 17/001; A01C 17/005; A01C 19/04; E01C 19/203; E01H 10/007
See application file for complete search history.

(56) References Cited

U.S. PATENT DOCUMENTS

| | | | | |
|---|---|---|---|---|
| 2,550,303 | A | * | 4/1951 | Simpson ............... A01C 17/00 222/512 |
| 3,383,055 | A | | 5/1968 | Speicher |

(Continued)

OTHER PUBLICATIONS

SaltDogg Buyers, WB400 Walk Behind Drop Salt Spreader, Assembly Instructions, at least as early as Apr. 2014.

(Continued)

*Primary Examiner* — Ryan Reis
(74) *Attorney, Agent, or Firm* — Kenneth J. Lukacher Law Group

(57) ABSTRACT

A manually operable spreader which can be moved from behind on a surface is especially suitable for distributing salt and other particulate materials which tend to conglomerate or clump in a hopper of the spreader. Wheels are mounted to a frame also support the hopper. A horizontal drive shaft between the wheels is coupled to rotate a vertical shaft. A distributor below the hopper rotates with vertical shaft rotation to distribute particulate material which drop via openings in the bottom of the hopper. The vertical shaft extends via a hole in bottom of hopper and carries at the top thereof an auger having a helical vane. The auger is rotatable with the vertical shaft as the spreader is moved on its wheels. The auger circulates the particulate material in the hopper as the spreader moves while directing material in the hopper towards the bottom thereof.

18 Claims, 4 Drawing Sheets

(51) Int. Cl.
    *A01C 19/04*     (2006.01)
    *B05B 3/10*     (2006.01)

(56) References Cited

U.S. PATENT DOCUMENTS

| | | | | |
|---|---|---|---|---|
| 3,782,642 | A | * | 1/1974 | Trafford ................ A01C 17/00 222/240 |
| 4,580,730 | A | * | 4/1986 | Amerine ................ A01C 17/00 239/683 |
| 4,671,434 | A | * | 6/1987 | Johnston ................ A01C 15/02 222/502 |
| 4,712,717 | A | | 12/1987 | Egerdahl |
| 4,867,381 | A | * | 9/1989 | Speicher ................ A01C 17/00 239/390 |
| 5,992,134 | A | | 11/1999 | Blide et al. |
| D689,527 | S | | 9/2013 | Maclean-Blevins |
| 8,523,086 | B2 | | 9/2013 | Warchola |
| 2012/0055130 | A1 | | 3/2012 | Au et al. |

OTHER PUBLICATIONS

EZ Tow Spreader, Chapin International, Inc., Spreader Catalog, p. 10, 2013.

* cited by examiner

MANUALLY OPERABLE PUSH FROM BEHIND SPREADER

Priority is claimed to U.S. Provisional Application No. 61/988,003, filed May 2, 2014, which is herein incorporated by reference.

DESCRIPTION

The present invention relates to an improved manually operated push from behind spreader which can effectively distribute onto the surface over which the spreader moves (the ground), salt or other particulate material which tends to conglomerate in the hopper of the spreader and form clumps which do not effectively drop through opening(s) in the bottom of the hopper for distribution over the surface. The salt and/or other particulate material which is contained in the hopper is referred to herein as "salt." Such material may be the natural sodium chloride salt, but can include any ice melting material which may or may not contain sodium chloride salts.

Various designs for push behind spreaders contain a vertical shaft driven by the drive wheels supporting the hopper of the spreader. The vertical shaft can have a distributor disc (or impeller) which distributes the salt dropping from openings along the bottom of the hopper over the ground while the spreader is pushed by an operator along the ground. Such vertical shaft typically contains in the hopper agitation pins which are for the purpose of breaking up clumps in the material to be spread. However, these agitator pins are not especially effective, merely stirring the salt material near the bottom of the hopper, and do not circulate the material so to minimize or avoid conglomerations and clumps therein causing undesirable full or partial blockage of salt dropping through openings onto the distributor disc. Reference may be had to the following U.S. Patents for the designs of such known spreaders: U.S. Pat. Nos. 3,383,055, 4,867,381, 4,580,730, and 4,671,434.

It is therefore desirable to circulate the material in a manner which effectively fluidizes the material in a hopper of a push behind spreader, so that the fluidized material can readily pass through openings in the bottom of the hopper and be distributed over the ground as the spreader is pushed over the ground. It is further desirable to utilize a vertical auger with a helical vane in such a hopper of a push from behind spreader, and the auger being operable to establish a circulation pattern for the salt throughout the hopper.

While motorized spreaders which are either pulled by tractors, or located on back of trucks have utilized augers, such augers have not been arranged to be operated in a push behind manually operated mode, and thereby do not circulate material to be spread within a hopper of a push from behind spreader in order to fluidize this material for drop spreading purposes. For examples of designs of such known motorized auger driven spreaders see U.S. Pat. Nos. 4,712,717 and 8,523,086.

Accordingly, it is the principal object of the present invention to provide an improved push from behind manual operated salt spreader.

It is a further object of the invention to provide an improved salt spreader in which an auger is disposed in order to circulate and thereby fluidize the salt and prevent conglomeration and clumping thereof so that the salt can flow downwardly through openings in the base or bottom of the hopper of the spreader and be distributed over the ground or other surface over which the spreader is pushed.

It is another object of the present invention to provide an improved salt spreader which does not rely on a motor for enabling operation of a vertical auger in the spreader hopper, or is part of a larger device having motorized operation, such as a trailer, truck, or lawn mower.

Briefly described, an improved salt spreader provided by the invention is pushed on wheels through which a shaft extends and which supports a hopper having openings at the bottom thereof through which the salt may drop and be spread over the ground or other surface over which the spreader is moved. A vertical shaft, driven by a drive shaft between the wheels extending through the bottom of the hopper, carries at the upper end thereof an auger, which is vertically disposed entirely adjacent to the bottom of the hopper, and may be no more than 10-35% of the height of the hopper (and preferably 25-35%). Accordingly when the salt of the hopper is in contact with the auger, the salt is circulated in a pattern inside the hopper, which extends toward the sides, then upwardly toward the top of the hopper and then downwardly back toward the auger. This circulation fluidizes the salt which then can readily drop through openings in the bottom of the hopper and be distributed over the ground or other surface over which the spreader is moved.

The foregoing and other objects, features and advantages of the invention will become more apparent from a reading of the following description in connection with the accompanying drawings in which.

Figure 1:
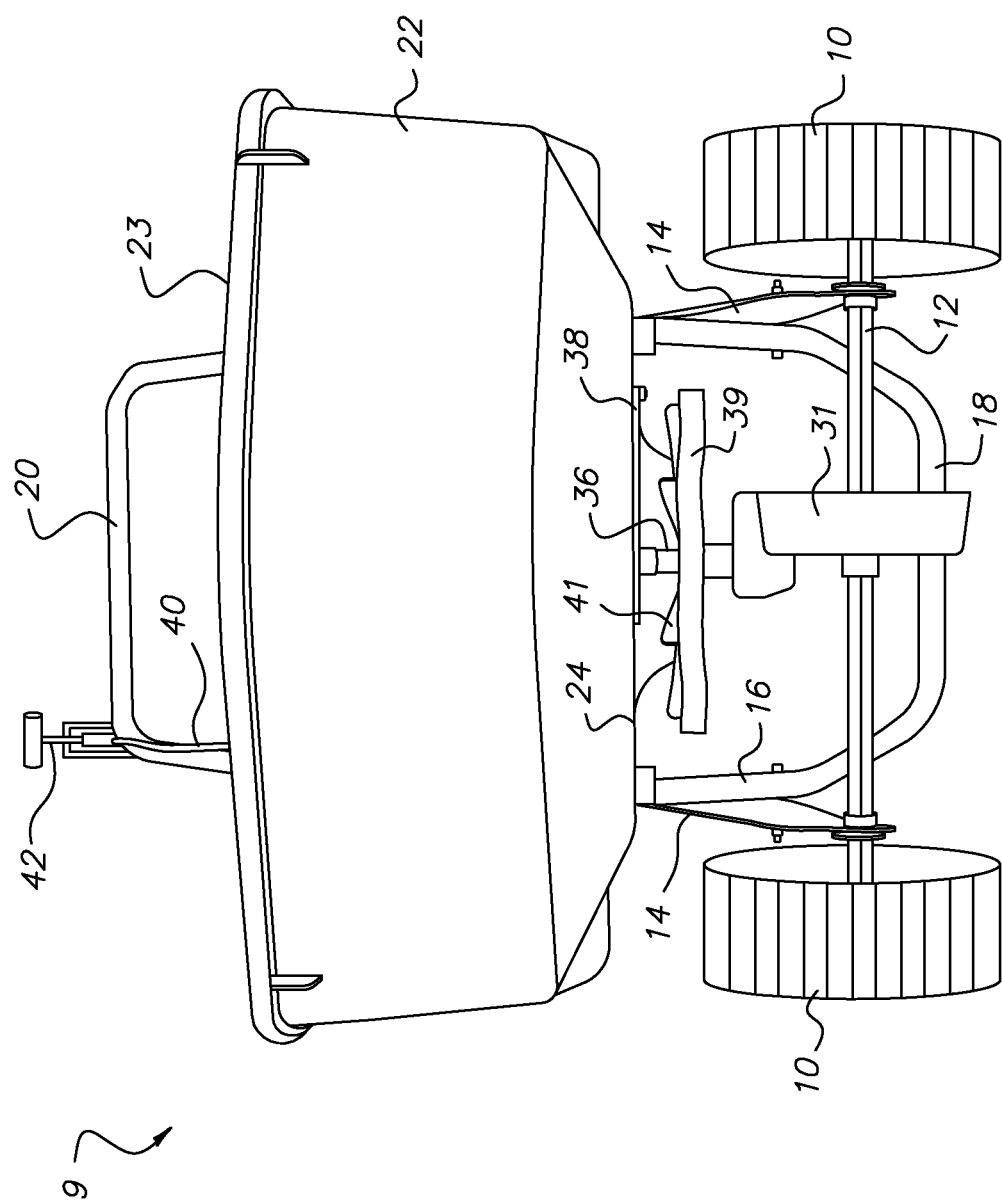
FIG. 1 is a front view of a salt spreader provided by the invention.
Figure 2:
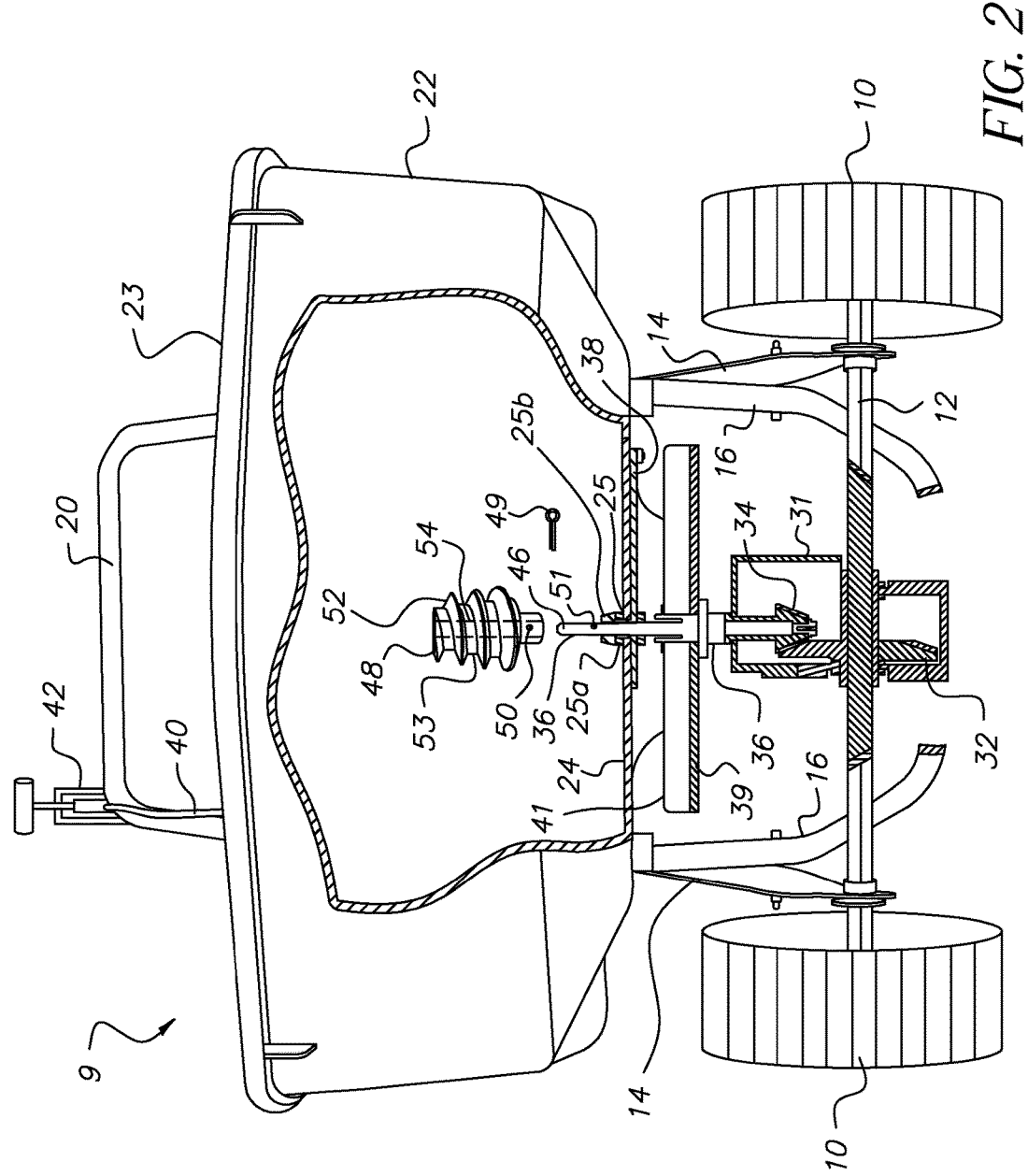
FIG. 2 is a view similar to FIG. 1, but broken away to show the design of the auger and other elements of the spreader for circulating the salt and distributing it, after the salt drops through openings in the bottom of the spreader, over the ground or other surface over which the spreader is moved.
Figure 3:
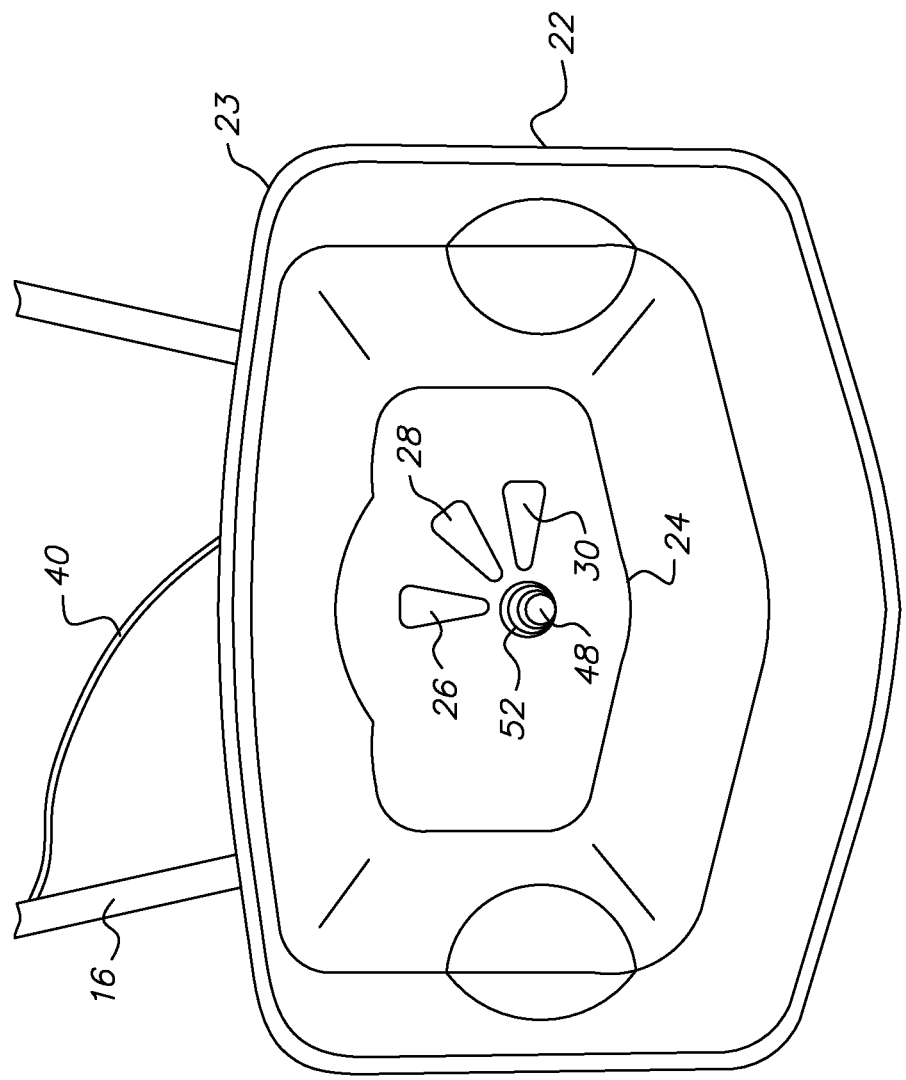
Figure 4:
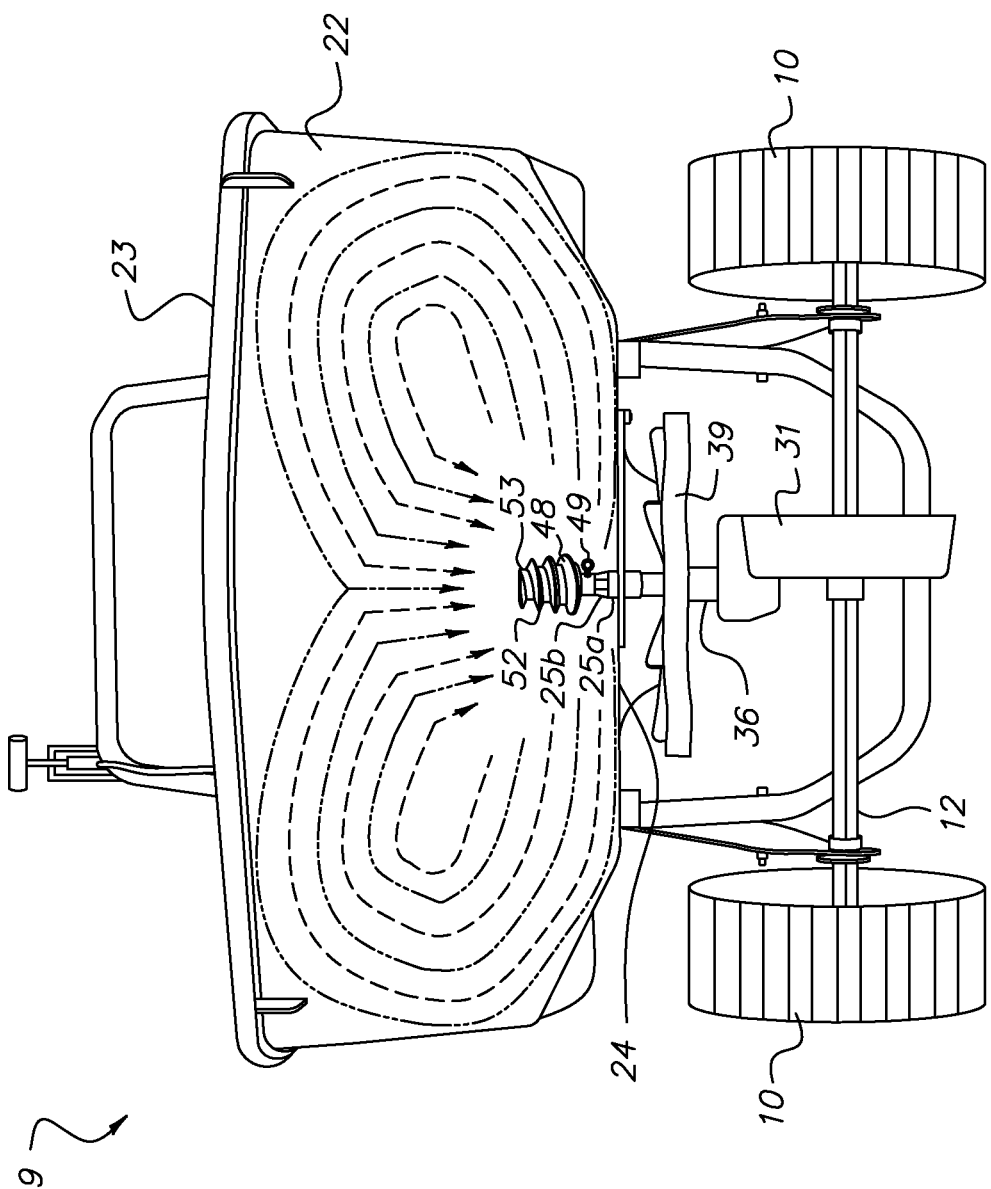

FIG. 3 is a top view illustrating the hopper, part of the frame structure of the spreader, a control cable and openings in the bottom of the hopper which can be selected by means of a gate which is moveable over the outside of the bottom of the hopper and articulated by the operator via the control cable; and FIG. 4 is a diagrammatic view illustrating the spreader shown in FIGS. 1-3 and how the short auger, adjacent to the bottom of the hopper, provides circulation for the salt in the hopper which fluidizes the salt and enables it to drop through the openings in the bottom of the hopper and be distributed over the surface over which the spreader is moved.

Referring to the drawings, there is shown a push from behind spreader 9 having wheels 10 between which a drive shaft 12 extends horizontally. The drive shaft 12 is supported by plates 14 attached to a tubular frame 16, which has a bottom 18 which may rest on the ground, and a handle section 20 which may be engaged and pushed by the operator. The drive shaft 12 may be generally rectangular in cross-section.

The frame also supports a hopper 22. The hopper 22 is of a bucket type molded plastic design having an open top end 23 and a closed bottom 24 with a plurality of openings, such as the generally triangular openings 26, 28 and 30, as best shown in FIG. 3. The hopper is shown in U.S. Pat. No. D689,527, which issued Sep. 10, 2013.

Attached to the drive shaft 12 is a gear box 31 having a gear assembly of a spur gear 32 and a pinion gear 34. The drive shaft 12 extends through the spur gear 32 and is attached thereto so that spur gear 32 rotates when drive shaft 12 rotates. The spur gear drives pinion gear 34, which is supported on a vertical shaft 36 that extends through an opening or hole 25 in bottom 24 of the hopper 22. Such gear assembly for coupling rotation from a horizontal drive shaft driven by wheels 10 to vertical shaft may be similar or the same as provided by typical push spreaders having rotating agitator pins.

Connected below the bottom of the hopper 22 and on the outside thereof is a gate plate 38 having a lower extending cylinder through which vertical shaft 36 extends so that gate plate 38 is pivotal about vertical shaft 36. Gate plate 38 has three corresponding openings which align with the three openings 26, 28, and 30 when gate is pivoted to its furthest open position, and as gate plate 38 pivots away from its furthest position it covers more of each of openings 26, 28, and 30 until full (or almost full) occlusion or closed position of the gate plate 38. A control cable 40 is connected to an articulated jack like control (or lever) 42 mounted on the handle section 20 of the frame 16. The control cable 40 is connected to the gate plate 38 to rotate the plate 38 via the cable 40 by the control 42 to a desired position with respect to openings 26, 28, and 30 in bottom 24 of hopper 22 so as to set the desired flow rate of salt from the hopper 22 via openings 26, 28, and 30 when the spreader is moving along by its wheels 10. The control 42 may be spring biased to a closed position, if desired. Although this control rate mechanism using gate plate 38 is shown, other mechanisms with or without a gate plate 38 may be used typical of controlling drop rate of particulates in a manual push from behind spreader.

Connected to the vertical shaft 36 below gate plate 38 is a distributor disc (or plate) 39 with radial vanes 41. Disc 39 is mounted to vertical shaft 36 so that it rotates with rotation of shaft 36. In this manner, distributor disc 39 is rotated by vertical shaft 36 when the drive shaft 12 is rotated by drive wheels 10 while the spreader 9 is being moved over the ground, via gearing 32 and 34. This distributor plate 39 distributes the material, when falling through the one or more openings 26, 28 and 30 (as set by gate plate 38 via control 42), in a selected pattern over the surface of the ground.

The vertical shaft 36 extends upwards from distributor disc 39 through the hole 25 in the bottom 24 of hopper 22. The shaft 36 extends through a raised cylindrical portion or boss 25*a* molded into bottom 24 of hopper 22. Prior to passage of vertical shaft 36 via hole 25, a ring of retainer clips 25*b* from gate plate 38 is extended through hole 25 to capture the upper edge of boss 25*a* as shown in FIG. 2.

In order to prevent conglomeration and clogging of the salt in the hopper 22, an auger 48 is provided which extends axially along the vertical shaft 36 at the top (or upper end) 46 thereof. The auger 48 has a helical rib or vane 52 along its exterior surface providing a path or channel 53 for moving material or particulates in hopper 22 in response to its rotation enabled by rotation of vertical shaft 36.

To attached auger 48 to vertical shaft 36, top 46 of the shaft 36 is received in a vertical bore 54 that extend from the auger's base entirely (or partially) through the auger. With auger 48 received upon shaft 36, a horizontal hole 50 that extends through the auger's base is aligned with a horizontal hole 51 that extend through vertical shaft 36. A cotter pin 49 is then used to retain auger 48 onto shaft 36 in which the straight portion of pin 49 extends through holes 50 and 51 and the non-straight portion of pin 49 extends along the outside of base of the auger, as typical of a cotter pin. Other mechanical coupling of auger 48 to shaft 36 may be provided than shown. For example, instead of providing pin 49 and holes 50 and 51, bore 54 is internally threaded so as to screw onto an externally threaded section along top 46 of the shaft 36. For purposes of illustration, auger 48 is shown enlarged in FIG. 2 with auger 48 and pin 49 removed from vertical shaft 36, so as to show top 46 of vertical shaft 36 and base of auger 48 prior to attachment thereto. Auger 48 is shown disposed upon shaft 36 in FIG. 4. Different auger(s) of different height, size, and/or one or more vanes, may be provided as desired by removal of pin 49 and placement onto shaft 36 for attachment thereto by such pin or other mechanical coupling mechanism.

As shown in FIG. 4, the auger 48 is disposed in close proximity and adjacent to the bottom 24 of hopper 22 and extends axially a short distance above the bottom 24 in a vertical direction towards the top 23 of the hopper. This axial length or height of the auger is from 10-35% of the distance from the bottom 24 to the top end 23 of the hopper 22, and preferably at or between 25-35%. The lowest end of the auger's helical vane 52 is positioned in hopper 22 spaced above bottom 24 of hopper 22 as shown in FIG. 4. The entire portion of the auger 48 along which particulates can move (i.e., helical vane 52 and channel 53) is preferably positioned in hopper 22 so it extends in hopper 22 above the height of openings 26, 28 and 30 (FIG. 3) through which particulates in hopper may drop.

For example, the height of hopper 22 along its interior from the surface of bottom 24 to its top end 23 may be at or approximately 8.5 inches, and the auger 48 extends to a height which may be at or approximately 2.75 inches from the surface of bottom 24. In the preferred embodiment, auger 48 is 2.5 inches high, and has generally conical shape with a lower end diameter of 2.25 inches to an upper end diameter of 1.5 inches of the helical vane 52. Thus, helical vane 52 reduces in diameter in a direction extending away from bottom 24 of hopper 22. The position of the bottom end of auger 48 adjacent clips 25*b* may be 0.25 inches from bottom 24. The auger 48 may be made of rigid material, such as stainless steel or molded plastic.

In operation, as the spreader 9 is moved across the ground, on which the salt is to be distributed, by being pushed by the operator using handle 20 of the frame 16, the wheels 10 turn and rotate the drive shaft 12, which rotates the vertical shaft 36 and therefore also rotates the auger 48. The auger 48 circulates the salt in a generally elliptical pattern first towards the sides of the hopper 22, then upwardly and finally around back towards the auger 48. The pattern of the circulation is illustrated in FIG. 4. It will be seen that the circulation provided by the auger 48 effectively fluidizes the salt thereby enabling the salt to drop through one or more of openings 26, 28 and 30, which would not be the case if the salt was conglomerated into clumps.

The rotation of the auger 48 (via shafts 12, 36 and gears 32, 34) may be bidirectional depending on the wheels 10 rotating with forward or backward motion respectively, as the spreader 9 is pushed in a forward direction or pulled in reverse direction, respectively, manually by an operator. In the forward rotation of wheels 10, auger 48 rotates so that salt in the hopper 22 is directed towards hopper bottom 24 (see circulation arrows of FIG. 4). In the reverse direction of wheels 10, auger 48 rotates the salt particulates in hopper 22 along its helical vane 52 away from bottom 22 (in opposite direction of arrows of FIG. 4). This has an advantage of enabling manual switching directions of auger rotation as desired by the operator. Such switching between directions of particulate circulation can be useful as needed to improve spreader operation until the particulates are effectively fluidized. For example, temporarily switching between circulation directions sometimes can assist in dislodging clump(s)

which may have reduced or blocked particulate flow in openings 26, 28, or 30 until such particulates are effectively fluidized (e.g., remove clumps that could otherwise block the extent of openings 26, 28 or 30 presented by gate plate 38) by auger 48 within hopper 22.

Thus, the advantage of the present invention over the prior art hopper's pin agitators is provided by having a rotatable auger 48 with a helical vane 52 having non-motorized rotational motion effectively driven by drive wheels 10 of the spreader 9 which support the hopper 22. The auger 48 circulates particulate material when present in the hopper 22 as the spreader 9 is moved on its drive wheels 10 forward across the ground or other surface. In the preferred embodiment, the auger 48 is adjacent to the bottom 24 of the hopper 22 and may only extend approximately 10-35% of the height of the hopper 22. However, other height relationship of auger 48 to hopper 22 may be less desirably used. The auger 48 thereby establishes a circulation pattern for the particulate material in the hopper 22 as the auger moves the salt particulate material down along vane 52 towards bottom 24 having openings 26, 28, and 30. This pattern established by auger rotation is toward the side walls of the hopper 22, then upwards toward the top side of the hopper 22 and then in a downward direction back to the auger towards bottom 24 in continuous fashion, thereby maintaining the salt in its particulate condition and avoiding clumps which prevent the salt from effectively dropping through openings 26, 28, and 30 in the bottom 24 of the hopper 22 and onto the ground for spreading of the salt over the ground or other surface. Accordingly, an efficient and practical push behind salt spreader is provided by the invention.

Variations and modifications in the design of the spreader illustrated herein will undoubtedly become apparent to those skilled in the art. Accordingly the above description should be taken as illustrative and not in a limiting sense.

The invention claimed is:

1. A spreader for particulate material comprising:
   a hopper for containing particulate material, in which said hopper has a bottom with one or more openings;
   drive wheels on which said hopper is supported and moved over a surface;
   a horizontal shaft between said drive wheels which rotates in concert with said wheels;
   a vertical shaft extending through the bottom of said hopper;
   a gear assembly for coupling rotation of said horizontal shaft to said vertical shaft; and
   an auger having a height to maintain it in adjacent proximity with the bottom of the hopper being disposed at the end of the vertical shaft for rotation when said vertical shaft rotates, so that a circulation of the particulate material is provided which effectively fluidizes the particulate material preventing conglomeration and clumping enabling the particulate material to smoothly drop through said one or more openings in the bottom of the hopper for distribution over the surface, wherein said auger is vertically disposed along said shaft with at least one helical vane that reduces in diameter in a direction away from said bottom of said hopper.

2. The spreader according to claim 1 wherein said auger extends axially from said bottom of said hopper no more than 10-35% of height of the hopper.

3. The spreader according to claim 1 wherein said auger extends vertically to a height in said hopper which is at or between 25-35% of a distance between said bottom of said hopper to a top of said hopper.

4. The spreader according to claim 1 wherein said lowest end of the vane is spaced above the bottom of said hopper.

5. The spreader according to claim 1 wherein said auger has at least a partial bore extending vertically from the bottom of said auger, and said end of said vertical shaft is received in said bore to position said auger upon said vertical shaft, in which said auger is retained to said vertical shaft for rotation with said vertical shaft.

6. The spreader according to claim 1 further comprising a frame supporting said hopper above said drive wheels, in which said wheels are mounted to said frame, and said frame comprises a handle section extending behind said hopper enabling manual pushing of said spreader from behind along said surface with rotation of said drive wheels.

7. The spreader according to claim 1 wherein said particulate material comprises salt.

8. The spreader according to claim 1 further comprising a distributor coupled for rotation with said vertical shaft, and being disposed between said hopper and said drive wheels to assist in distributing said particulate material that drop through said one or more openings in the bottom of the hopper over the surface.

9. The spreader according to claim 1 further comprising a plate below said hopper adjacent said one or more openings which is pivotal along said one or more openings to open and close at least partially said one or more openings so as to control rate said particulate material drops through said one or more openings over the surface.

10. In a salt spreader having a hopper for containing salt particulate, said hopper having a bottom with at least one opening through which the particulates can drop for spreading, and an agitator rotationally mounted on a shaft extending through the bottom of the hopper, the improvement comprising wherein said agitator is an auger having at least one helical vane extending axially of the auger, the auger being disposed in a vertical direction upwards from the bottom of the hopper for circulating the salt particulates around the hopper in a path for preventing conglomeration of the particulates and enabling passage thereof through said at least one opening in the bottom unrestricted by clumps of conglomerated particulates, wherein the auger extends axially from the bottom of the hopper to a height at or less than 35% of the height of the hopper, wherein said at least one helical vane reduces in diameter in a direction extending away from said bottom of said hopper.

11. A manually operated push from behind spreader of particulate material comprising:
    a hopper for receiving particulate material, in which said hopper has a bottom with one or more openings; and
    a vertically disposed auger in said hopper having a helical vane in which non-motorized rotational motion is applied to said auger to move the particulate material when present in said hopper along said vane towards said bottom of said hopper, wherein said helical vane reduces in diameter in a direction extending away from said bottom of said hopper.

12. The spreader according to claim 11 further comprising wheels on which said hopper is supported and moved over a surface, in which rotation of said wheels along said surface is coupled for rotating a vertical shaft upon which said auger is vertically disposed to provide said non-motorized rotational motion to said auger.

13. The spreader according to claim 11 wherein said auger extends vertically to a height in said hopper which is at or between 10-35% of a distance between said bottom of said hopper to a top of said hopper.

14. The spreader according to claim 11 wherein said auger extends vertically to a height in said hopper which is at or between 25-35% of a distance between said bottom of said hopper to a top of said hopper.

15. The spreader according to claim 11 wherein said lowest end of said vane is spaced above the bottom of said hopper.

16. The spreader according to claim 1 wherein said auger has a height at or less than 35% of the height of the hopper from the bottom thereof.

17. The improvement according to claim 10 wherein said path the salt particulates around the hopper is along the bottom upwardly from the bottom towards the top and back downwardly.

18. The spreader according to claim 11 wherein said auger has a height at or less than 35% of the height of the hopper.

* * * * *